United States Patent [19]

Wollar et al.

[11] Patent Number: 4,740,123
[45] Date of Patent: Apr. 26, 1988

[54] RE-USABLE EXPANDABLE PLASTIC NUT FOR TWO-PIECE FASTENER

[75] Inventors: Burnell Wollar, Barrington, Ill.; Richard J. Schwind, Akron, Ohio

[73] Assignee: Phillips Plastics Corporation, Phillips, Wis.

[21] Appl. No.: 12,785

[22] Filed: Feb. 9, 1987

[51] Int. Cl.⁴ ............................................. F16B 13/04
[52] U.S. Cl. ........................................ 411/38; 411/55
[58] Field of Search ................................... 411/34–38, 411/55, 59, 182, 512, 437, 908

[56] References Cited

U.S. PATENT DOCUMENTS

| | | | |
|---|---|---|---|
| 3,365,999 | 1/1968 | Perlin | 411/34 |
| 3,385,156 | 5/1968 | Polos | 411/37 |
| 3,404,596 | 10/1968 | Ryder | 411/36 |
| 4,571,136 | 2/1986 | Peek | 411/512 |
| 4,639,175 | 1/1987 | Wollar | 411/38 |
| 4,674,931 | 6/1987 | Schwind et al. | 411/437 |

FOREIGN PATENT DOCUMENTS

| | | | |
|---|---|---|---|
| 979688 | 12/1975 | Canada | 411/38 |
| 1505595 | 3/1978 | United Kingdom | 411/38 |

Primary Examiner—Neill R. Wilson
Attorney, Agent, or Firm—James E. Nilles; Thomas F. Kirby

[57] ABSTRACT

A two-piece fastener comprises a screw and a plastic nut for releasably securing together two apertured panels. The screw comprises a screw head and a threaded screw shank insertable in the aperture of one panel. The nut comprises a nut head, a nut shank insertable in the aperture of the other panel, and a bore extending through both the nut head and nut shank to receive the screw shank. The nut shank has an expandable portion, a screw-engaging portion, and a common wall therebetween. The bore has an unthreaded bore region through the nut head and through expandable nut shank portion, an intermediate bore region through the common wall and in a part of the screw-engaging nut shank portion, and a threaded bore region through the screw-engaging nut shank portion. The expandable nut shank portion comprises a plurality of thin, flexible, resilient walls, each connected between the common wall and the nut head. Each flexible wall has a parabolically shaped recess on its inner surface along which it can bend. Each adjacent pair of flexible wall is separated by a slit which extends axially from the common wall and through the nut head. A single thread on the wall of the intermediate bore region engages the screw thread to maintain the screw and nut in pre-assembled condition and to guide the screw thread into engagement with discrete screw-engaging thread sections formed in the threaded bore region.

9 Claims, 2 Drawing Sheets

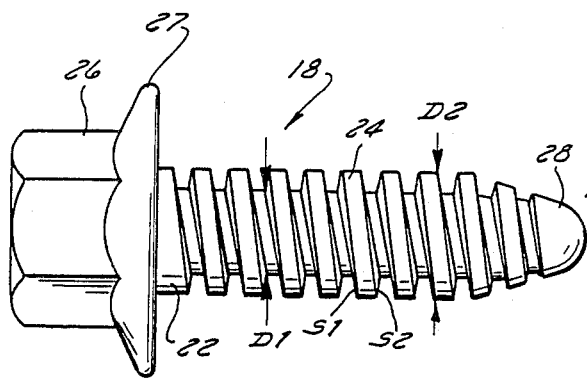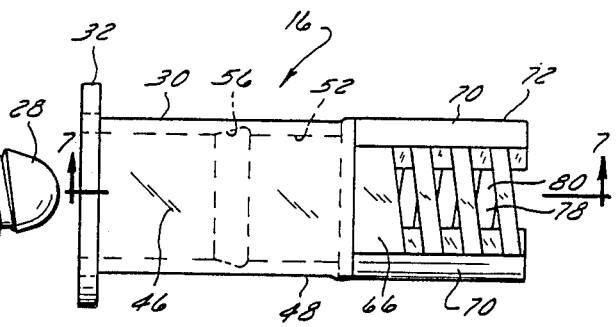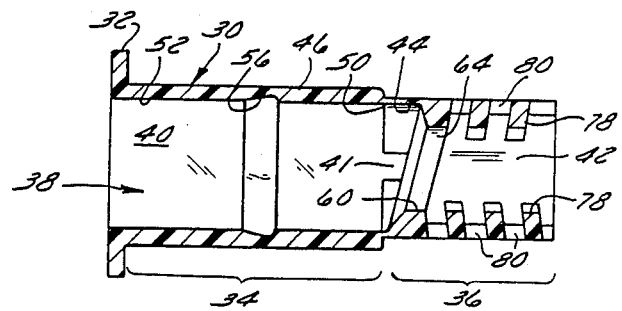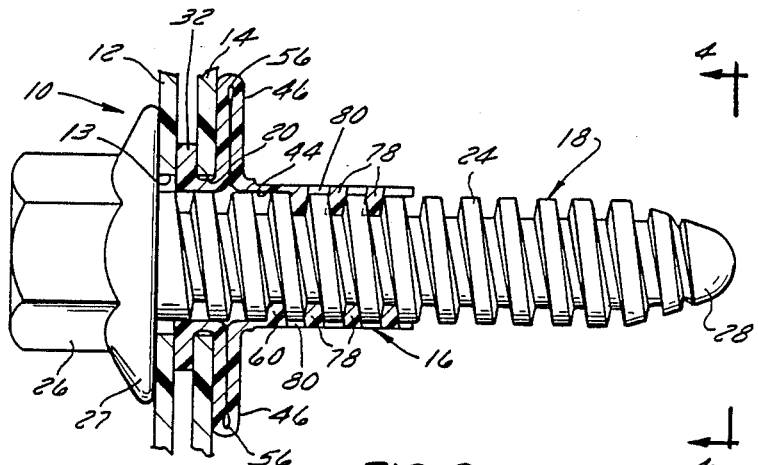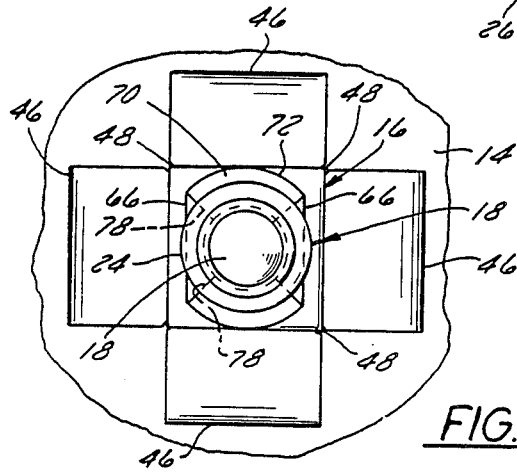

RE-USABLE EXPANDABLE PLASTIC NUT FOR TWO-PIECE FASTENER

FIELD OF USE

This invention relates to a re-usable expandable plastic nut for a two-piece fastener which is employed to releasably secure together two components, such as panels.

DESCRIPTION OF THE PRIOR ART

A wide variety of expandable plastic nuts for two-piece fasteners are disclosed in prior art patents and are commercially available. Some prior art two-piece fasteners for securing two panels together typically comprise a screw and a plastic expansion nut. The screw comprises a screw head and a threaded screw shank. The nut comprises a nut head, a nut shank and nut bore through the nut head and nut shank. A portion of the nut shank has outwardly expandable walls and a portion of the nut bore is threaded for engagement with the screw thread. In use, the nut shank is inserted into an aperture in one panel. The screw shank is inserted into an aperture in the other panel and into the nut bore. Initial rotation of the screw causes the screw thread to engage the threaded portion of the nut bore. Further rotation of the screw causes outward expansion of the nut shank walls, whereby the said one panel becomes entrapped between nut head and the expanded walls, and whereby the said other panel becomes entrapped between the screw head and the nut head.

In some such prior art two-piece fasteners, the nut threads in the threaded portion of the nut bore are of such a construction that it is difficult to effect initial engagement thereof with the screw thread and, in some cases, cross-threading occurs. This problem is further compounded if the nut is free to rotate in its panel aperture as the screw is being inserted. Also, in some cases, the nut threads are relatively flimsy and easily damaged or destroyed if overtorquing of the screw occurs, especially if the screw is made of metal and the nut is plastic. Another difficulty frequently encountered is that, even though the screw is removable and the expansion nut is theoretically re-usable, repeated flexing of the expandable nut walls caused by screw insertion and removal causes one or more expandable walls to break along the fold line thereby rendering the nut unusable. In view of these problems, it is desirable to provide an improved plastic expansion nut.

SUMMARY OF THE PRESENT INVENTION

In accordance with the present invention there is provided a two-piece fastener which is usable to releasably secure together two components, such as panels, each of which has an aperture therethrough. The fastener comprises a screw and an improved re-usable plastic expansion nut, each of which has a head end and an insertion end. The screw, which may be metal or plastic, comprises a screw shank having a screw thread therearound and a screw head at one end. The nut, which is formed of plastic by injection molding, comprises a nut shank having a nut head at one end and a nut bore extending through the nut head and nut shank. The nut shank comprises an outwardly expandable shank portion near its head end and an internally threaded portion near its insertion end and those two portions are integrally joined by a common wall therebetween through which the nut bore extends. The expandable shank portion, which has a non-circular external cross-sectional configuration so that it cannot rotate in a similarly configured panel aperture, comprises a plurality of thin resiliently flexible outwardly foldable walls. Each wall is defined by a pair of narrow slits which extend axially from the common wall and through the nut head. A depression of parabolic cross-section is formed on the inside surface of each flexible wall to define a fold region to facilitate flexing and folding and thereby prevent breakage along the fold line. The internally threaded portion of the nut shank is provided with a plurality of discrete, mechanically strong screw-engaging thread sections which are arranged in axially spaced apart relationship on opposite side walls of the internally threaded portion of the nut shank and extend into the nut bore. The thread sections have the same size and pitch as the screw thread. The common wall and part of the internally threaded portion of the nut shank are provided internally with a single screw-engaging thread, of the same pitch and size as the screw thread, which extends into the nut bore and serves two purposes: to engage the screw and hold it in pre-assembled position on the nut during shipment and storage prior to use and to guide the screw into proper engagement with the thread sections when the fastener is being installed. In a typical use and after the screw and nut are disengaged from each other if pre-assembled, the nut shank is inserted into an aperture in one panel. The screw shank is inserted into an aperture in the other panel and into the nut bore. Initial rotation of the screw causes the screw thread to first engage the single screw-engaging thread and then to engage the thread sections in the threaded portion of the nut bore. Further rotation of the screw causes outward expansion of the nut shank walls, whereby the said one panel becomes entrapped between nut head and the expanded walls, and whereby the said other panel becomes entrapped between the screw head and the nut head.

A nut in accordance with the invention offers several important advantages over the prior art. For example, the non-circular cross-sectional configuration of that portion of the nut shank which is disposed in a correspondingly shaped panel aperture automatically prevents nut rotation during screw insertion and removal and thereby eliminates the need for a wrench to hold the nut against rotation. The expandable walls or legs are easy to flex outwardly and inwardly because they are flat and relatively thin and because the parabolic depression on the inside of each defines a definite bend line or fold line of reduced thickness. The parabolic cross-sectional shape of the depression is such that stress points are reduced or eliminated and the legs can be repeatedly flexed outwardly and inwardly without risk of breakage or tearing along the fold line as the nut is used and re-used.

The single screw-engaging thread in the nut bore serves two important functions. It enables pre-assembly of the nut and screw prior to actual use thereby preventing loss or misplacement of one or the other and preventing lost production time. And, in use, it guides the screw into proper engagement with the thread sections in the bore.

The common wall between the expandable portion of the nut shank and the screw-engaging portion ensures that axial force applied by the screw to the thread sections as the screw is rotated into final position is firmly and evenly transmitted by the common wall to the ends of the outwardly expandable legs to cause them to expand outwardly in predictable and coordinated fashion.

The screw-engaging portion of the nut shank wherein the several thread sections are provided which can be made to any length and the thread sections themselves are relatively strong and, therefore, resist tearing out of the thread sections, even if the screw is over-torqued during screw insertion.

The screw-engaging portion of the nut shank is designed to facilitate the formation of the thread sections during injection molding, but the slots adjacent the thread sections do not detract from the overall strength of the nut.

Other objects and advantages of the invention will hereinafter appear.

DRAWINGS

FIG. 1 is a side elevation view of a screw of a two-piece fastener in accordance with the invention;

FIG. 2 is a side elevation view of a nut of the fastener;

FIG. 3 is a side elevation view of the screw of FIG. 1 and the nut of FIG. 2 showing them assembled and being used to releasably secure two panels together;

FIG. 4 is a view taken on line 4—4 of FIG. 3;

FIG. 8 is a cross-section view of the nut taken on line 7—7 of FIG. 2;

DESCRIPTION OF A PREFERRED EMBODIMENT

Figure 6:
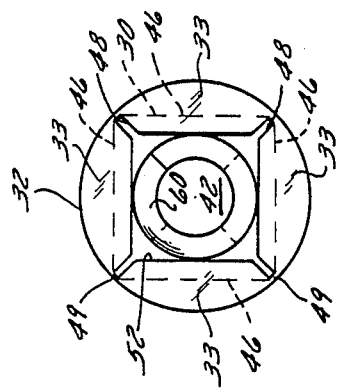
FIG. 6 is an elevation view of the head end of the nut of FIG. 5.

Referring to FIGS. 1, 2, 3 and 4, there is shown a fastener 10 in accordance with the invention, which is re-usable and is employed to releasably secure one component, such as a panel 12, to another component, such as a panel 14, comprises a nut 16, having a nut bore 38, and screw 18. Panel 12 has an aperture 13 therethrough for receiving screw 18 and panel 14 has an aperture 20 for receiving nut 16. In operation, nut 16 is axially inserted into aperture 20 in panel 14. Then, screw 18 is axially inserted through aperture 13 in panel 12 and into nut bore 38. Screw 18 is then rotated to effect expansion of nut shank 30 of nut 16, whereby panel 14 is entrapped between nut head 32 and expanded nut shank 30 and whereby panel 12 is entrapped between screw head 26 and nut head 32.

Referring to FIG. 1, screw 18, which is preferably formed by injection molding from plastic, but which could be made of metal or other suitable material, comprises a screw shank 22, a screw thread 24 integrally formed on the screw shank, hexagonal screw head 26 integrally formed at the head end of the screw shank, a circular nut head flange 27 integrally formed on the nut head, and a blunt insertion tip 28 integrally formed at the insertion end of the screw. Screw thread 24 has a root diameter D1 and a larger outer thread diameter D2 and has upper and lower screw thread surfaces S1 and S2, respectively.

Referring to FIGS. 2 through 9, nut 16, which is preferably formed by injection molding from slightly resilient deformable plastic, such as Nylon, comprises a nut shank 30 and circular nut head 32 integrally formed at the head end of the nut shank.

Figure 5:
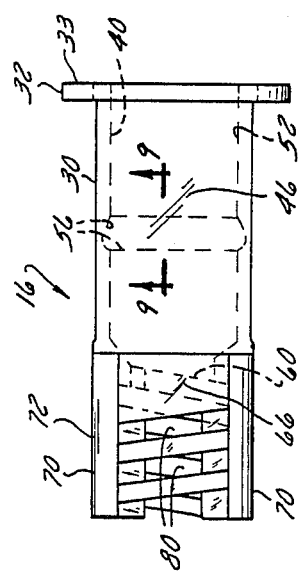
FIG. 5 is an enlarged side elevation view of the nut of FIGS. 2 and 3, and showing it rotated on its axis 180° from the position shown in FIG. 2.

As FIGS. 2, 5 and 8 show, nut shank 30 comprises three portions, namely, a resiliently expandable nut shank portion 34 near its head end, and an integrally formed internally threaded screw-engaging nut shank portion 36 near its insertion end, and a common wall 44 which joins the nut shank portions 34 and 36 together. Nut 16 is provided with nut bore 38 for receiving threaded screw shank 22. Referring to FIG. 8, bore 38 extends axially through nut head 32, through the nut shank portion 34, through common wall 44, and through nut shank portion 36. Nut bore 38 is divided into three nut bore portions or regions, namely, a nut bore portion 40 which extends through nut head 32 and through expandable nut shank portion 34, a nut bore portion 41 which extends through end wall 44, and a nut bore portion 42 which extends through screw-engaging nut shank portion 36.

Figure 9:
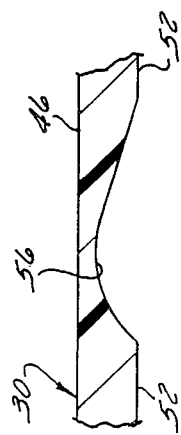
FIG. 9 is a greatly enlarged cross-section view of a portion of the nut taken on line 9—9 of FIG. 5.

Referring to FIGS. 5 through 9, expandable nut shank portion 34 has a rectangular (i.e., square, for example) external cross-sectional configuration which matches the configuration (i.e., square, for example) of aperture 20 in panel 14 to thereby prevent nut rotation as screw 18 is rotatably inserted or removed. Nut bore portion 40 in nut shank portion 34 also has a rectangular (square) internal cross-sectional configuration. More specifically, nut shank portion 34 comprises four thin flat resilient bendable side walls or legs 46 and each pair of adjacent legs define a corner, but are separated from each other by an axially extending slot 48. Each slot 48 extends from the head end side 50 (FIG. 8) of end wall 44 and through nut head 32 (FIGS. 5 and 6). Each slot 48, where it enters nut head 32, is bridged by a small web 49 (FIG. 6) which is integral with nut head 32. Thus, as FIG. 6 best shows, nut head 32 is seen to comprise four head sections 33 and each of the two adjacent head sections 33 in a pair of head sections are oined by a web 49. As FIGS. 5, 8 and 9 show, each leg 46 is provided on its inner surface 52 with a depression 56 which facilitates outward and subsequent inward bending of the leg during installation of fastener 10. Depression 56 preferably has a parabolic cross-sectional configuration (FIG. 9) so as to enable maximum outward bendability of its associated leg 46 and provides minimum risk of fracturing the leg during bending. It is to be noted that the legs 46 unbend from the position shown in FIGS. 3 and 4 and return to flat condition (FIGS. 2, 5, 8 and 9) when screw 18 is withdrawn from nut 16 and the nut is withdrawn from panel aperture 20.

Referring to FIGS. 1 and 8, nut bore portion 40 is of larger diameter than outer thread diameter D2. The common wall 44 and a part (near the head end) of screw-engaging nut shank portion 36 have a screw-engaging thread 60 (FIG. 8) integrally formed thereon which defines nut bore portion 41. Thread 60 extends through spiral arc of approximately 360° (i.e., one wrap of thread) and is of the same pitch and size as screw thread 24 on screw shank 22 of screw 18. Thus, the diameter of nut bore portion 41 is of only slightly larger diameter than root diameter D1 of screw thread 24.

Referring to FIGS. 5, 6, 7 and 8, screw-engaging nut shank portion 36 of nut shank 30, through which part of nut bore portion 40 and nut bore portion 42 extend is integrally connected to the insertion end side 64 (FIG.

Figure 7:
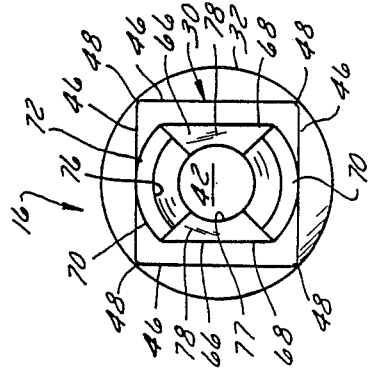
FIG. 7 is an elevation view of the insertion end of the nut of FIG. 5.
Figure 10:
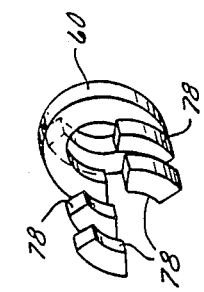
FIG. 10 is an enlarged perspective view of the orientation of the threads in the nut bore.

8) of end wall 44. As FIG. 7 shows nut shank portion 36 has an external cross-sectional configuration which is defined by two oppositely disposed side walls 66 which have flat outside surfaces 68 and by two other oppositely disposed side walls 70 which have curved or arcuate outside surfaces 72. The maximum distance between the two curved outside surfaces 72 is the same as the distance between the outside surfaces of two oppositely disposed legs 46. The distance between the two flat outside surfaces 68 is slightly less than the distance between the outside surfaces of two oppositely disposed legs 46.

As FIG. 7 shows, each side wall 70 has the aforementioned curved outside surface 72 and also has a curved inside surface 76 which define and confronts nut bore portion 42. The distance between the two opposite curved inside surfaces 76 is slightly greater than the outer thread diameter D2 of screw thread 24 of screw 18.

As FIGS. 5, 6, 7 and 8 show, each side wall 66 has the aforementioned flat outside surface 68 and is provided on its inside surface 77 with a plurality of integrally formed discrete screw-engaging thread sections 78. In the embodiment depicted herein, one side wall 66 has two such thread sections 78 which are axially spaced (FIG. 8) from thread 60 and from each other. The other side wall 66 also has two such thread sections 78 which are axially spaced from thread 60 and from each other. As FIG. 7 shows, each thread section 78 is arcuate in shape and has the same pitch and size as screw thread 24 of screw 18. As FIGS. 5 and 8 show, two adjacent theread sections 78 on a side wall 66 are spaced apart from each other by a slot 80 which extends through the side wall 66. The slots 80 are formed by tooling (not shown) in a die (not shown) in which nut 16 is formed and this tooling in conjunction wiht other tooling (not shown) operates to form the thread sections 78. The spacing between two opposed thread sections 78 is slightly larger than the root diameter D1 of screw thread 24 of screw 18. The slots 80 have the same pitch or slope as the adjacent thread sections 78.

We claim:

1. A plastic expansion nut for receiving a screw comprising:
   a nut shank having a head end and an insertion end, said nut shank comprising an outwardly expandable portion near its head end, and a screw-engaging portion near its insertion end and a common wall joining said portion;
   a nut head at said head end of said nut shank;
   a screw-receiving bore having a bore wall and extending through said nut head, through said nut shank and through said common wall;
   a screw-engaging thread formed on said bore wall of said common wall of said nut shank;
   a plurality of discrete screw-engaging thread sections formed on said bore wall of said screw-engaging portion of said nut shank between said screw-engaging thread and said insertion end of said nut shank,
   some of said discrete thread sections being located on one side of said bore wall and the others being located on the opposite side of said bore wall, those discrete thread sections on each wall being axially spaced apart from each other;
   said nut shank having a plurality of resiliently flexible outwardly expandable wall sections located between said nut head and said screw-engaging thread to define said outwardly expandable portion,
   said outwardly expandable nut shank portion having a non-circular cross-sectional configuration,
   each wall section having a flat outer surface and a flat inner surface and having a depression of parabolic cross-sectional configurations formed in said flat inner surface thereof to facilitate bending of said wall section,
   each said wall section being defined by a pair of slots communicating between the outside of said nut and the bore therewithin,
   each slot extending axially along said nut shank and extending through said nut head.

2. A plastic expansion nut according to claim 1 wherein said screw-engaging thread takes the form of a single wrap of thread extending through approximately 360°.

3. A plastic expansion nut according to claim 1 wherein said expandable portion of said nut shank has a rectangular outer cross-sectional configuration and has four of said wall sections.

4. A two-piece fastener comprising a screw and a nut for releasably securing together two components, each of which component has an aperture therethrough;
   said screw comprising:
   a screw shank;
   a screw head at one end of said screw shank;
   and a screw thread on said screw shank;
   said nut comprising:
   a nut shank;
   a nut head at one end of said nut shank;
   and a screw-receiving bore extending through said nut head and said nut shank;
   said nut shank having:
   an expandable portion,
   a screw-engaging portion,
   and a common wall between said portions;
   said bore having:
   an unthreaded region through said nut head and through said expandable portion of said nut shank,
   an intermediate region through said common wall and in a part of said screw-engaging portion of said nut shank,
   and a threaded region through said screw-engaging portion of said nut shank;
   said expandable portion of said nut shank comprising a plurality of flexible wall sections, each wall section having a flat outer surface and a flat inner surface and being connected at one end to said common wall and connected at its other end to said nut head, each wall section being provided on its flat inner surface with a recess of parabolic cross-sectional configurations along which the wall section may bend, each adjacent pair of wall sections being separated by a slot which extends axially from said common wall and through said nut head;
   a screw-engaging thread on a bore wall defining said intermediate region of said bore for threadedly engaging said screw thread on said screw to maintain said screw and nut in preassembled condition and to guide said screw thread into said threaded region;
   and discrete screw-engaging thread sections on opposite bore walls defining said threaded region.

5. A fastener according to claim 4 wherein said screw-engaging thread takes the form of a single wrap of thread extending through approximately 360°.

6. A fastener according to claims 4 or 7 wherein said expandable portion of said nut shank has a rectangular outer cross-sectional configuration and has four of said wall sections.

7. A plastic expansion nut for receiving a screw comprising:

a nut shank having a head end and an insertion end, said nut shank comprising an outwardly expandable portion near its head end, and a screw-engaging portion near its insertion end and a common wall joining said portion;

a nut head at said head end of said nut shank;

a screw-receiving bore having a bore wall and extending through said nut head, through said nut shank and through said common wall;

a screw-engaging thread formed on said bore wall of said common wall of said nut shank;

a plurality of discrete screw-engaging thread sections formed on said bore wall of said screw-engaging portion of said nut shank between said screw-engaging thread and said insertion end of said nut shank, some of said discrete thread sections being located on one side of said bore wall and the others being located on the opposite side of said bore wall, those discrete thread sections on each wall being axially spaced apart from each other;

said nut shank having a plurality of resiliently flexible outwardly expandable wall sections located between said nut head and said screw-engaging thread to define said outwardly expandable portion, said outwardly expandable nut shank portion having a non-circular cross-sectional configuration, each wall section having a flat inner surface and a flat outer surface and having a depression formed in said flat inner surface thereof, said depression being spaced from said nut head and from said screw-engaging thread to facilitate bending of said wall section intermediately of its opposite ends, each said wall section being defined by a pair of slots communicating between the outside of said nut and the bore therewithin, each slot extending axially along said nut shank and extending through said nut head.

8. A plastic expansion nut according to claim 7 wherein said screw-engaging thread takes the form of a single wrap of thread extending through approximately 360°.

9. A plastic expansion nut according to claims 7 or 8 wherein said expandable portion of said nut shank has a rectangular outer cross-sectional configuration and has four of said wall sections.

* * * * *